(12) United States Patent
Schneider et al.

(10) Patent No.: US 8,671,535 B2
(45) Date of Patent: Mar. 18, 2014

(54) SHAFT LOADING DEVICE

(75) Inventors: Jens Schneider, Neusäss (DE);
Burkhard Pinnekamp, Augsburg (DE)

(73) Assignee: Renk Aktiengesellschaft, Augsburg (DE)

( * ) Notice: Subject to any disclaimer, the term of this patent is extended or adjusted under 35 U.S.C. 154(b) by 523 days.

(21) Appl. No.: 13/047,261

(22) Filed: Mar. 14, 2011

(65) Prior Publication Data

US 2011/0227270 A1    Sep. 22, 2011

(30) Foreign Application Priority Data

Mar. 17, 2010   (DE) .......................... 10 2010 002 980

(51) Int. Cl.
*B23P 11/00*      (2006.01)
*G01B 7/16*       (2006.01)
*G01L 3/00*       (2006.01)
*B23Q 3/00*       (2006.01)

(52) U.S. Cl.
USPC ..... 29/281.1; 73/779; 73/862.322; 269/289 R

(58) Field of Classification Search
USPC ................ 269/289 R, 309–310, 900, 21, 20;
73/862.322; 29/281.1, 281.3, 281.5
See application file for complete search history.

(56) References Cited

U.S. PATENT DOCUMENTS

2004/0244496 A1*  12/2004  Bernhard et al. ............... 73/779

* cited by examiner

*Primary Examiner* — Lee D Wilson
*Assistant Examiner* — Nirvana Deonauth
(74) *Attorney, Agent, or Firm* — Cozen O'Connor

(57) ABSTRACT

Shaft loading device for a test stand, having a shaft receptacle for receiving a shaft to be loaded for testing and a rotational bearing device which is constructed as a combination of sliding bearing support of the shaft receptacle and plurality of actuators acting directly on the sliding bearing support for selective application of bearing force to the shaft receptacle.

9 Claims, 3 Drawing Sheets

SHAFT LOADING DEVICE

BACKGROUND OF THE INVENTION

1. Field of the Invention

The invention is directed to a shaft loading device for a test stand such as, for example, a shaft loading device for a test stand for testing rotor shafts of wind power plants.

2. Description of the Related Art

Shaft loading devices are used for subjecting shafts to different loads that emulate real-world load scenarios in a test stand so as to test their durability. An important field of use for shaft loading devices of this type is in the testing of rotor shafts which support the load of the rotor blades of a wind power plant and deliver the torque generated by these rotor blades to a gearbox or directly to a generator.

An example of a test stand for testing propeller shafts is shown on page 4 of the document "Tailor-Made Test Systems" by RENK Test System GmbH. This document is accessible in the download area on the following webpage: http://www.renk-testsystem.eu.

Shaft loading devices in current use have a rotational bearing support for the shaft to be tested and a plurality of cylinders which are mechanically separated from the rotational bearing support and which are provided for applying forces so as to realize a certain load scenario. In case of large structural component parts such as rotor shafts in wind power plants, for example, all of these components can present substantial masses to be moved. Moreover, owing to its complexity, a shaft loading device of this kind can give rise to considerable costs.

SUMMARY OF THE INVENTION

An object of the invention is to provide a shaft loading device for a test stand which is constructed in a simple manner and has fewer moving masses.

According to an embodiment of the invention, a shaft loading device for a test stand has a shaft receptacle for receiving a shaft to be loaded for testing and a rotational bearing device which is constructed as a sliding bearing support of the shaft receptacle combined with a plurality of actuators acting directly on the sliding bearing support or directly via the sliding bearing for selective application of bearing force to the shaft receptacle.

According to an embodiment of the invention, force application and bearing support of the shaft are combined so that there is no need for a separate bearing support or separate force application. The simplified construction of the shaft loading device of the present invention is less complex than that of the prior art device so that costs may be reduced. Further, the moving mass of the shaft loading device is reduced with respect to the prior art devices, which is advantageous especially with respect to dynamic processes. By combining a plurality of bearings, modular units can be produced. Further, a bearing support which is free of play is made possible by the combined force application and bearing support.

An extremely long life of the shaft loading device can be achieved through the use of a sliding bearing support. Further, sliding bearing supports for large dimensions are readily commercially available.

According to an embodiment of the invention, the shaft to be loaded is receivable in the shaft receptacle such that the shaft is enclosed circumferentially and such that the shaft and shaft receptacle are in driving connection. Further, the rotational bearing device has an annular sliding bearing structure in a driving connection with the shaft receptacle and arranged on the radially outer side of the shaft receptacle so as to enclose the shaft receptacle circumferentially. The sliding bearing structure has a plurality of sliding bearing surfaces and a plurality of actuators, wherein each of the actuators has a working member which is in a driving connection with a sliding bearing element in each instance, and wherein the actuators are each arranged such that the sliding bearing element can be brought into sliding contact with a sliding bearing surface of the sliding bearing structure by the working member so that the shaft receptacle is supported so as to be rotatable around an axis of rotation. The rotational bearing device further includes a base at which each of the actuators is supported. The actuators are controllable selectively so that the sliding bearing structure and, therefore, the shaft receptacle can be loaded selectively by determined bearing forces and loading forces by the working members.

Through the use of a sliding bearing support, it is possible, as is realized according to the invention, to connect the sliding bearing support and the actuators in frictional engagement and mechanically in series so that the sliding bearing elements form a component part of the sliding bearing support as well as the elements of the shaft loading device delivering the bearing force or loading force.

The bearing forces and loading forces can be applied so as to be distributed in any manner desired over the entire circumference by the annular sliding bearing structure.

According to another embodiment of the invention, the actuators are each constructed as hydraulic cylinders, wherein the piston-piston rod unit of the hydraulic cylinder preferably forms the working member. Of course, other actuators (preferably linear actuators) such as, e.g., a spindle drive, are also conceivable.

According to yet another embodiment of the invention, the sliding bearing surfaces have a plurality of axial sliding bearing surfaces, wherein the sliding bearing elements have a plurality of axial sliding bearing elements, and wherein the axial sliding bearing elements can be brought into sliding contact with the axial sliding bearing surfaces so that the shaft receptacle is supported axially.

This construction of the invention allows axial bearing forces and loading forces to be directed via the sliding bearing structure to the shaft receptacle and, by way of the latter, applied as overturning moment of the shaft to be tested in a simple and efficient manner by the axial bearing support of the shaft receptacle.

According to another embodiment of the invention, the axial sliding bearing surfaces have two axial sliding bearing surfaces which extend perpendicular to the axis of rotation of the shaft receptacle and which face away from one another, wherein the axial sliding bearing elements for sliding contact are distributed symmetrically on the two axial sliding bearing surfaces facing away from one another.

Bearing forces can be realized in both axial directions in a simple and efficient manner by this construction of the invention.

According to another embodiment of the invention, the axial sliding bearing elements for sliding contact are arranged annularly at the two axial sliding bearing surfaces facing away from one another.

This advantageously assists in applying the bearing forces in any desired distribution over the entire circumference.

According to another embodiment of the invention, the axial sliding bearing elements are arranged on different diametrical planes. In this way, the overturning moment generated by equal axial bearing force can be varied in a simple and efficient manner so that the multiplicity of load scenarios that can be realized is advantageously increased.

According to yet another embodiment of the invention, the sliding bearing surfaces have a radial sliding bearing surface, wherein the sliding bearing elements have a plurality of radial sliding bearing elements, and wherein the radial sliding bearing elements can be brought into sliding contact with the radial sliding bearing surface so that the shaft receptacle is supported radially.

This construction of the invention allows radial bearing forces and loading forces to be directed via the sliding bearing structure to the shaft receptacle and, by way of the latter, applied as bending moment of the shaft to be tested in a simple and efficient manner by the radial bearing support of the shaft receptacle.

According to another embodiment of the invention, the radial sliding bearing surface is constructed as a circumferential surface extending parallel to the axis of rotation of the shaft receptacle, wherein the radial sliding bearing elements for sliding contact are arranged annularly in a symmetrical manner along the radial sliding bearing surface.

This advantageously assists in the application of bearing forces in any desired distribution over the entire circumference.

According to another embodiment of the invention, the actuators include pairs of actuators located opposite one another, wherein the oppositely located actuators forming a pair are each controllable simultaneously so that a synchronous running of the pair of actuators is achieved.

According to an embodiment of the invention, each actuator is formed as a hydraulic cylinder, and the pairs of oppositely located hydraulic cylinders are preferably controlled by the same hydraulic valve so that a double rod-end cylinder is achieved by the action of the pair. A hydraulic double rod-end cylinder has a piston rod on both sides of a piston face. Therefore, the volume of hydraulic fluid flowing in and out is always equal and, accordingly, the double rod-end cylinder also moves in and out at the same velocity.

According to another embodiment of the invention, the sliding bearing structure has the shape of a U-profile in which the crosspiece is arranged on the radially outer side with respect to the shaft loading device and in which the two legs extend radially inward from the crosspiece to the shaft receptacle, preferably parallel to one another and perpendicular to the axis of rotation of the shaft receptacle, wherein the two legs are fastened to the shaft receptacle, and wherein the sliding bearing surfaces are formed on the outer side of the crosspiece and at the outer sides of the two legs of the U-profile.

This construction of the sliding bearing structure according to the invention makes it extremely compact and therefore saves space. Owing to the U-shape of the sliding bearing structure, the friction heat generated at the sliding bearing surfaces can be transferred to the environment in a simple manner via the communicating inner surfaces of the sliding bearing structure.

Finally, virtually any spatially oriented load vectors can be realized by the construction of the sliding bearing structure according to the invention and the arrangement and construction of the actuators according to the invention so that virtually all possible load scenarios can be simulated.

According to an embodiment form of the invention, the shaft loading device configured to receive and test or load rotor shafts for wind power plants which support the load of the rotor blades of a wind power plant and deliver the torque generated by these rotor blades to a gearbox or directly to a generator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail in the following based on a preferred embodiment form and with reference to the accompanying drawings.

DETAILED DESCRIPTION OF THE PRESENTLY PREFERRED EMBODIMENTS

Figure 1:
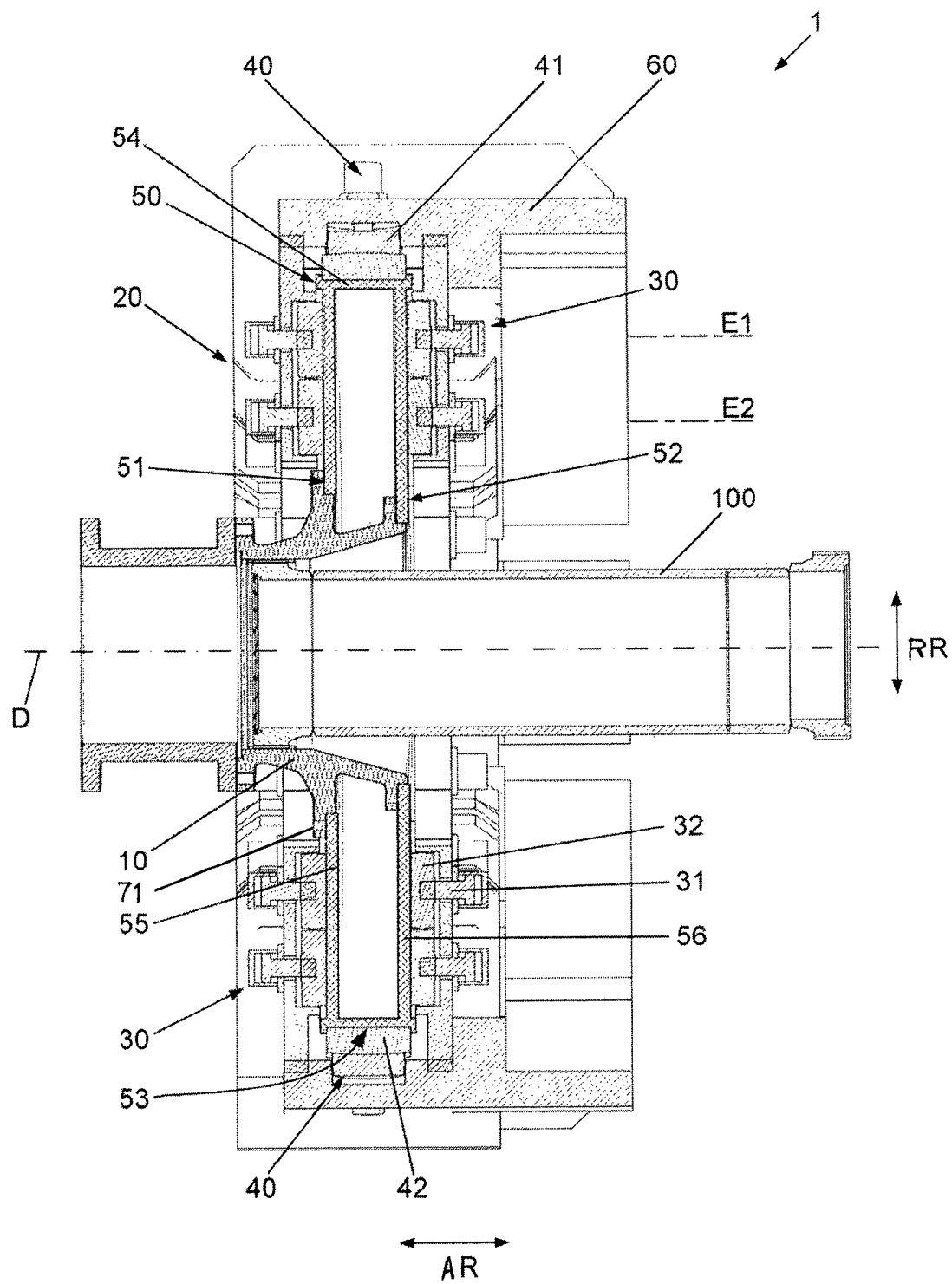
FIG. 1 is a schematic longitudinal sectional view through a shaft loading device according to an embodiment form of the invention.
Figure 2:
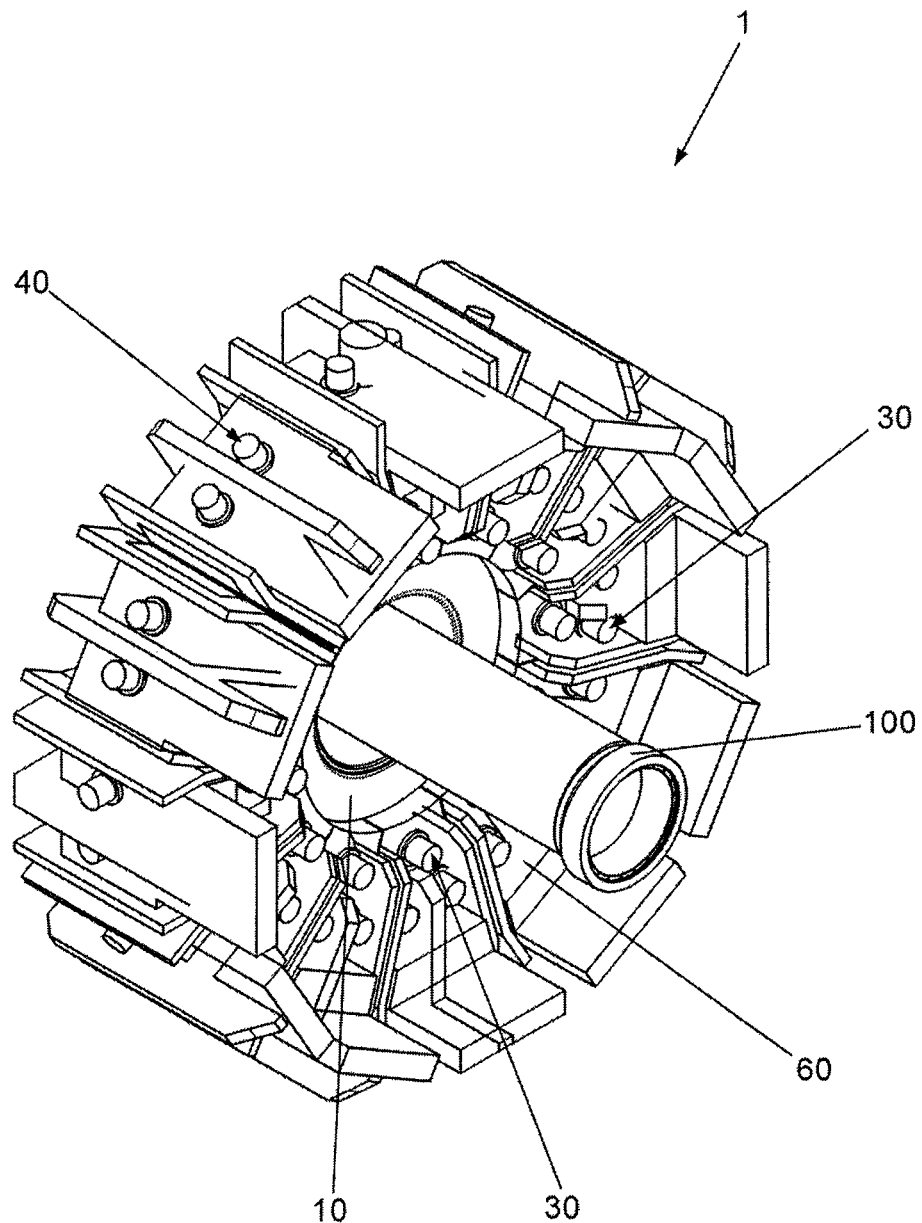
FIG. 2 is a perspective schematic view of the shaft loading device of FIG. 1.

FIGS. 1 and 2 show schematic views of a shaft loading device 1 for a test stand according to an embodiment of the invention. In the present embodiment, the shaft loading device 1 is set up to receive and test or load the rotor shafts for wind power plants (not shown) which support the load of the rotor blades of a wind power plant and deliver the torque generated by these rotor blades to a gearbox or directly to a generator.

An axial direction AR and a radial direction RR are defined as shown in FIG. 1 for the shaft loading device 1 for the following description of the invention.

The shaft loading device 1 has a shaft receptacle 10 for receiving a shaft 100 which is to be loaded for testing and which is constructed in this instance as a rotor shaft of a wind power plant (not shown) and a rotational bearing device 20 which is constructed as a combined sliding bearing support of the shaft receptacle 10 and plurality of actuators 30, 40 acting directly on the sliding bearing support for selective application of bearing force to the shaft receptacle 10.

The shaft receptacle 10 of the shaft loading device is constructed in such a way that the shaft 100 to be loaded can be received, or is received, in the shaft receptacle 10 so as to be enclosed circumferentially and so that the shaft 100 and the shaft receptacle 10 are in a rotationally driving connection with one another. The rotationally driving connection can be realized by a frictional engagement and/or by a positive engagement.

The rotational bearing device 20 has an annular sliding bearing structure 50 and a base 60 which is constructed in the form of a housing in this instance.

The sliding bearing structure 50 is arranged on the radially outer side of the shaft receptacle 10 so as to be in a rotational driving connection with the shaft receptacle 10 and so as to enclose the shaft receptacle 10 circumferentially and has a plurality of sliding bearing surfaces 51, 52, 53.

More specifically, the sliding bearing structure 50 has the shape of a U-profile in which a crosspiece 54 is arranged on the radially outer side with respect to the shaft loading device 1 and in which the two legs 55, 56 extend from the crosspiece 54 radially inward to the shaft receptacle 10. The two legs 55, 56 are fastened to the shaft receptacle 10, e.g., by a pin connection and/or screw connection 71, and the sliding bearing surfaces 51, 52, 53 are formed on the outer side of the crosspiece 54 and on the outer side of the two legs 55, 56 of the U-profile.

According to the present embodiment example, each actuator 30, 40 is constructed as a hydraulic cylinder and has a working member 31 and 41, respectively, which is formed in this instance by the piston-piston rod unit of the hydraulic cylinder and which is in a driving connection with a sliding bearing element 32 and 42, respectively, for linear driving of the latter.

The actuators 30, 40 are each arranged in such a way that the sliding bearing element 32, 42 can be brought (or is brought, as shown in FIG. 1) into sliding contact with a sliding bearing surface 51, 52, 53 of the sliding bearing structure 50 by the working member 31, 41 so that the shaft receptacle 10 is supported so as to be rotatable around an axis of rotation D. The actuators 30, 40 are each supported at and fastened to the base 60.

Figure 3:
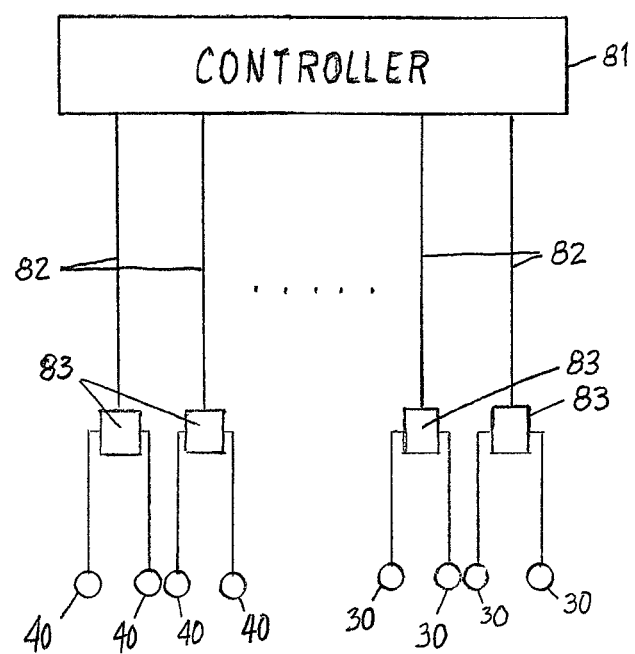
FIG. 3 is a schematic diagram of a control for actuators of the shaft loading device.

As shown in FIG. 3, the actuators 30, 40 are selectively controllable by hydraulic lines 82, hydraulic valves 83 and a control device 81 so that the sliding bearing structure 50 and, therefore, the shaft receptacle 10 can be loaded selectively by defined bearing forces by means of the working members 31, 32.

The sliding bearing surfaces 51, 52, 53 have two annular axial sliding bearing surfaces 51, 52, and the sliding bearing elements 32, 42 have a plurality of axial sliding bearing elements 32. The axial sliding bearing elements 32 can be brought into (or, as shown in FIG. 1, are brought into) sliding contact with the axial sliding bearing surfaces 51, 52 so that the shaft receptacle 10 is supported axially.

More specifically, the two axial sliding bearing surfaces 51, 52 extend along the outer side of the legs 55, 56 of the sliding bearing structure 50 perpendicular to the axis of rotation D of the shaft receptacle 10 and face away from one another in axial direction AR, and the axial sliding bearing elements 32 for sliding contact are distributed annularly symmetrically on the two axial sliding bearing surfaces 51, 52 facing away from one another.

As can be seen from FIG. 1 and FIG. 2, the axial sliding bearing elements 32 are arranged at the axial sliding bearing surfaces 51, 52 at different diametrical planes E1 and E2.

Further, the sliding bearing surfaces 51, 52, 53 have a radial sliding bearing surface 53, the sliding bearing elements 32, 42 have a plurality of radial sliding bearing elements 42, and the radial sliding bearing elements 42 can be brought into (or, as shown in FIG. 1, are brought into) sliding contact with the radial sliding bearing surface 53 so that the shaft receptacle 10 is supported radially.

The radial sliding bearing surface 53 is formed as a circumferential surface extending parallel to the axis of rotation D of the shaft receptacle 10, and the radial sliding bearing elements 42 for sliding contact are arranged symmetrically annularly along the radial sliding bearing surface 53.

As can be seen from FIGS. 1 and 2, the actuators 30, 40 have pairs of actuators 30, 30 located opposite one another in axial direction AR and pairs of actuators 40, 40 located opposite one another in radial direction RR. The actuators 30, and 40, 40, respectively, which are located opposite one another to form pairs can be controlled simultaneously, respectively, by a shared hydraulic valve 83 (see FIG. 3) so that a synchronous running of the pair of actuators 30, 30 and 40, 40, respectively, or, in effect, a double rod-end cylinder, is achieved. In other words, when one actuator 30 or 40 of the pair moves out, the other actuator 30 or 40 of the pair moves in at the same velocity.

In conclusion, virtually any spatially oriented load vectors can be realized by the construction of the sliding bearing structure 50 according to the invention and the arrangement and construction of the actuators 30, 40 according to the invention, so that virtually all possible load scenarios can be simulated for the shaft 100.

In a corresponding test stand (not shown), the base 60 of the shaft loading device 1 is supported so as to be fixed with respect to relative rotation, and the shaft 100 is driven in rotation by a drive (not shown) such as an electric motor, for example. While the shaft 100 is driven in rotation, different load scenarios are simulated for the shaft 100 by the shaft loading device 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A shaft loading device for a test stand, comprising: a shaft receptacle configured to receive a shaft to be loaded for testing; and a rotational bearing device having a sliding bearing support supporting said shaft receptacle and a plurality of actuators acting directly on said sliding bearing support, each said plural actuators being actuatable to act directly on the sliding bearing support to selectively apply a defined bearing force to the shaft receptacle; wherein said shaft receptacle is configured to circumferentially enclose the shaft when the shaft is received therein so that the shaft and the shaft receptacle are in driving connection; wherein said rotational bearing device has an annular sliding bearing structure in a driving connection with said shaft receptacle and encloses said shaft receptacle circumferentially, said sliding bearing structure having a plurality of sliding bearing surfaces, wherein each of said actuators has a working member in a driving connection with a respective sliding bearing element, said each of said actuators being actuatable to bring said sliding bearing element into sliding contact with one of said sliding bearing surfaces of said sliding bearing structure by said associated working member such that said shaft receptacle is rotatably supported for rotation about an axis of rotation, and wherein each of said actuators also comprises a base supporting said each of said actuators, said actuators being individually selectively controllable such that said sliding bearing structure and said shaft receptacle can be selectively loaded by said defined bearing forces by said working members.

2. The shaft loading device of claim 1, wherein said sliding bearing surfaces include a plurality of axial sliding bearing surfaces, said sliding bearing elements include a plurality of axial sliding bearing elements, and said axial sliding bearing elements are actuatable to slidably contact the axial sliding bearing surfaces and support said shaft receptacle axially.

3. The shaft loading device of claim 2, wherein said axial bearing surfaces have two axial sliding bearing surfaces extending perpendicular to the axis of rotation of said shaft receptacle and which face away from one another, said axial bearing elements being distributed symmetrically on said two axial sliding bearing surfaces facing away from one another.

4. The shaft loading device of claim 3, wherein said axial bearing elements are arranged annularly at said two axial sliding bearing surfaces facing away from each other.

5. The shaft loading device of claim 4, wherein said axial sliding bearing elements are arranged on different diametrical planes.

6. The shaft loading device of claim 1, wherein said sliding bearing surfaces include a radial sliding bearing surface, said sliding bearing elements have a plurality of radial sliding bearing elements, and said radial sliding bearing elements are actuatable to slidably contact said radial sliding bearing surface so that said shaft receptacle is supported radially.

7. The shaft loading device of claim 6, wherein said radial sliding bearing surface is constructed as a circumferential surface extending parallel to the axis of rotation of said shaft receptacle, wherein the radial sliding bearing elements are arranged annularly and symmetrically along said radial sliding bearing surface.

8. The shaft loading device of claim 1, wherein said actuators include pairs of actuators arranged opposite to each other relative to the axis of rotation, each of said pairs of actuators is controllable simultaneously such that said pairs of actuators run synchronously.

9. The shaft loading device of claim 1, wherein said sliding bearing structure comprises a U-shaped structure having a cross-piece arranged on a radially outer side and two legs extending radially inward from said crosspiece toe said shaft receptacle, said legs being fastened to said shaft receptacle, and said sliding bearing surfaces being formed on outer sides of said crosspiece and said two legs.

\* \* \* \* \*